No. 871,363. PATENTED NOV. 19, 1907.
C. R. SCHMIDT.
CONCRETE MIXING AND MOLDING APPARATUS.
APPLICATION FILED MAR. 12, 1907.
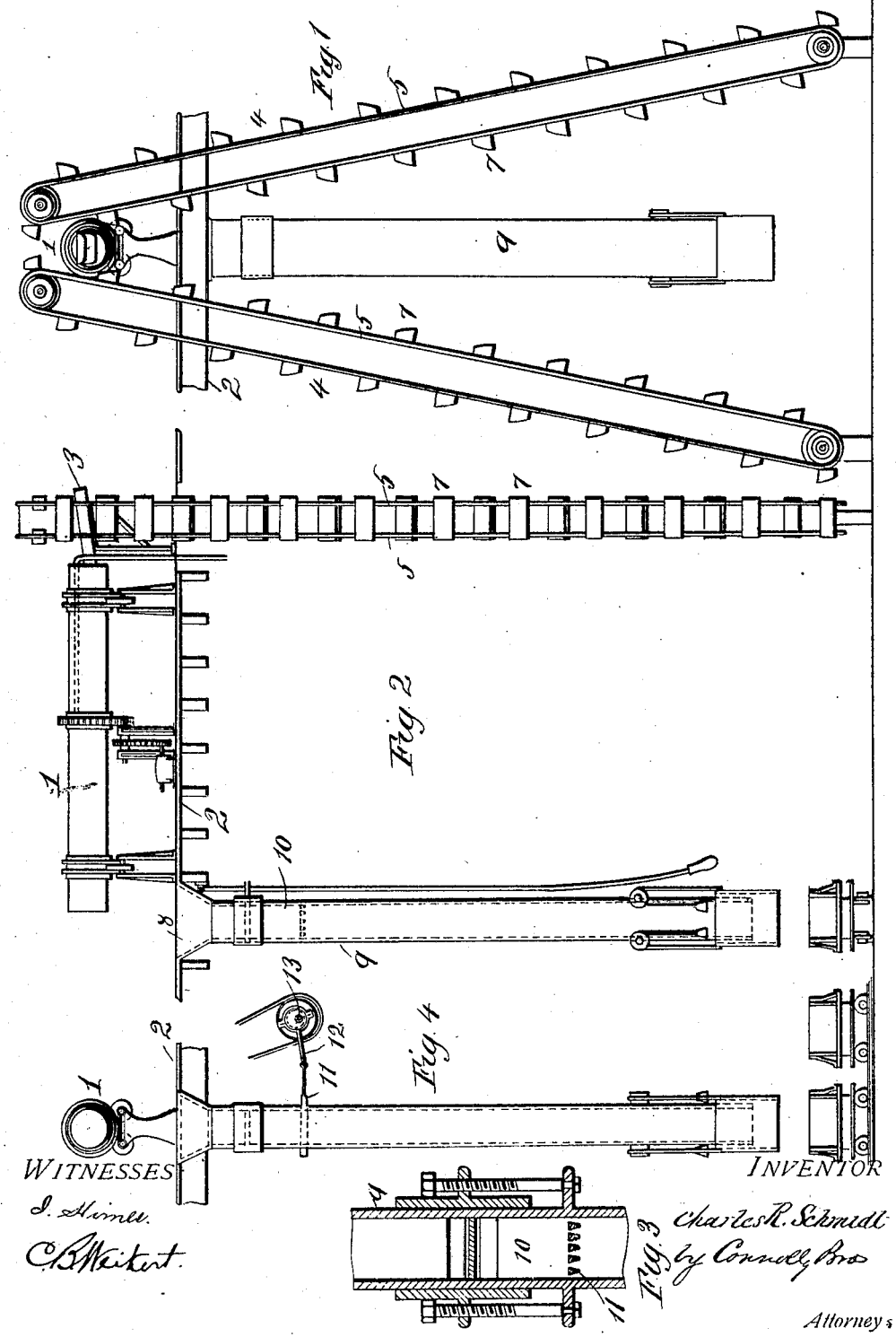

UNITED STATES PATENT OFFICE.

CHARLES R. SCHMIDT, OF BALTIMORE, MARYLAND.

CONCRETE MIXING AND MOLDING APPARATUS.

No. 871,363.　　　　Specification of Letters Patent.　　　Patented Nov. 19, 1907.

Application filed March 12, 1907. Serial No. 361,914.

*To all whom it may concern:*

Be it known that I, CHARLES R. SCHMIDT, a citizen of the United States, residing in the city of Baltimore and State of Maryland, have invented certain new and useful Improvements in Concrete Mixing and Molding Apparatus, of which the following is a specification.

This invention has relation to concrete mixing and molding apparatus, designed and adapted particularly for mixing and molding concrete forming materials for the making of building blocks.

The object of this invention is to provide 1st. novel means for feeding the cement and granular material to form the concrete, in definite proportions to the mixing tank, whereby the mixing of the concrete is greatly facilitated and uniformity in the quality of the concrete secured. 2nd. Novel means for measuring the exact quantity of mixture to fill a mold, dividing the same into pellets of proper size, and filling and compacting the material in the mold-boxes. 3rd. To provide a mixing and molding machine in which the mixing of the concrete and the forming of the molds will constitute a continuous operation.

In the accompanying drawings illustrating the apparatus embodying my invention: Figure 1 is an end elevation of the lifting, mixing and mold supplying apparatus. Fig. 2 is a side elevation, Fig. 3 a vertical section of part of the apparatus. Fig. 4 is a fragmentary end elevation of the apparatus.

In carrying my invention into effect, I locate a suitable revolving concrete mixing tank 1, preferably on an elevated platform or stage 2, and on each side of the hopper 3, thereof, I erect an endless conveyer 4 of any suitable type, preferably consisting of twin chains 5 and 6 carrying buckets 7. The conveyers are inclined in opposite directions and run from the floor line or earth level to points above the mixer, their upper ends being brought into close proximity with each other, directly over the mouth of the hopper. The material is carried up and supplied to the mixing tank by the conveyers, from heaps or bins, and as sand and cement, or other ingredients are used in different proportions, provision for properly feeding the material is made by making the buckets or flights of the respective conveyers of different capacity in which event, the conveyers, being run at the same speed, will convey to the mixing tank the cement and sand or rubble in different proportions.

When it is desired to vary the proportions of ingredients the buckets or flights, which are removable, may be taken off and others of different size substituted, or the relative speed of the conveyers may be varied so that in a given time one will feed faster than the other.

The means for delivering the mixed material to the mold-boxes comprise a hopper 8, located below the outlet end of the mixing tank, and a vertical chute 9, depending from the hopper and provided with a valved measuring chamber 10 and a suitable, vibratory riddle or grid 11, operated from a power shaft by a pitman 12 and eccentric 13. The mixed material is continuously delivered from the mixer to the hopper of the dividing and mold supplying chute and is first measured, then divided by the action of the grid or riddle into pellets which are then dropped into the mold-boxes 14, carried on trucks 15 in which they are compacted together with uniform pressure, thus producing a mold the density of which is uniform throughout.

What I claim as my invention and desire to secure by Letters Patent is:

1. A continuous mixing and molding apparatus, comprising a mixing tank located on an elevated platform, a plurality of endless conveyers arranged and adapted to convey the different ingredients of a concrete mixture, in different proportions to the mixing tank, a chute extending downwardly from the platform and a grid or riddle arranged at the upper end of said chute.

2. A continuous mixing and molding apparatus, comprising a mixing tank, a plurality of endless conveyers arranged and adapted to convey the ingredients of the concrete mixture to the mixing tank in different proportions, a vertical chute through which the mixture is dropped into the molds, said chute being provided with a valved measuring chamber, and a vibrating grid or riddle substantially as described.

3. In an apparatus for filling molds, a vertical chute for delivering material to molds from a height, said chute being provided with a measuring chamber, means for regulating the capacity of said chamber, and a vibrating grid or griddle, substantially as described.

In testimony whereof I affix my signature, in presence of two witnesses.

CHARLES R. SCHMIDT.

Witnesses:
 Jos. B. Connolly,
 Thos. A. Connolly.